Figure 1:
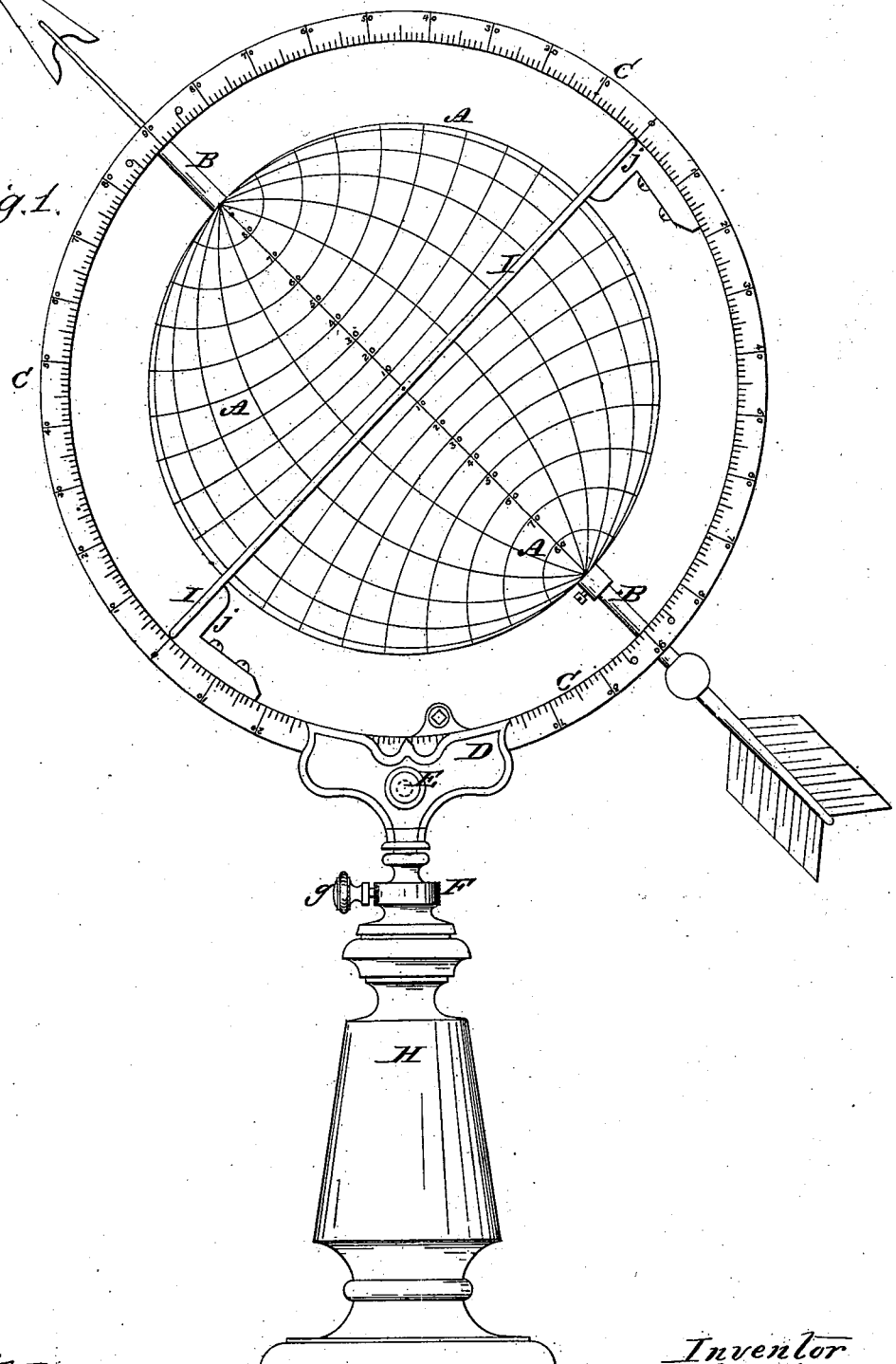

2 Sheets—Sheet 2.

J. ARKELL & A. G. RICHMOND.
Globe.

No. 227,713. Patented May 18, 1880.

Witnesses
Jacob Felbel
H. C. Janvier

Inventor
Adebert G. Richmond
and James Arkell
By atty. J. N. McIntire

UNITED STATES PATENT OFFICE.

JAMES ARKELL AND ADELBERT G. RICHMOND, OF CANAJOHARIE, NEW YORK, ASSIGNORS TO JUVET & CO., OF SAME PLACE.

GLOBE.

SPECIFICATION forming part of Letters Patent No. 227,713, dated May 18, 1880.

Application filed February 7, 1880.

*To all whom it may concern:*

Be it known that we, JAMES ARKELL and ADELBERT G. RICHMOND, of Canajoharie, in the county of Montgomery and State of New York, have invented certain new and useful Improvements in Globes; and we do hereby declare that the following is a full and exact description thereof, reference being had to the accompanying drawings, making part of this specification.

Previous to our invention what are known as "time-globes" and "globe-clocks" have been made in which equatorial dials have been employed for the purpose of readily indicating the time of day and night at various places; and it has also been common to mount terrestrial globes in frames provided with an equatorial ring, so that by an observation and calculation as to the number of degrees of difference in longitude differences in time between places could be determined. But in the first-named class or kind of apparatus considerable complication and expense are involved by the use of the necessary clock mechanism, while in the last-named sort of apparatus a calculation is necessary in order to determine the relative time of various places on the globe, and no means are provided for determining this readily and by visual inspection only of the apparatus.

Our invention has for its object to provide for general use a globe fixture or apparatus which, while it shall not involve the expense and complication necessary to a time-globe or globe-clock, shall embody the necessary means for a ready and correct determination by visual inspection only of the relative time of various places on the earth's surface; and to this end and object our invention consists in the employment, in combination with the usual terrestrial globe, mounted to turn freely by hand-power in the ordinary meridian-ring, (supported in a suitable stand,) of an equatorial dial-ring having marked and numbered upon it the time-divisions of the diurnal movement of the earth, whereby upon a mere visual inspection, with globe set so as to indicate the local time at any place, the relative time at any other place is observable by the relation of the meridian-line of any such other place to the equatorial dial.

A further object of our invention is to facilitate the observations thus of relative time of different places; and to this secondary object another part of our invention consists in the addition to or use in connection with the usual terrestrial globe, mounted and combined with an equatorial dial, as described, of supplemental names of prominent places placed near the equator of the globe, but in the same longitude as the localities they designate, for the purpose of indicating to the eye of the observer at a glance and without having to follow down or up the meridian-line on which any such place is actually located to discover the relation of the meridian to the dial, all as will be hereinafter more fully explained.

To enable those skilled in the art to make and use our invention, we will proceed to more fully explain the same, referring by letters to the accompanying drawings, making part of this specification, and in which—

Figure 2:
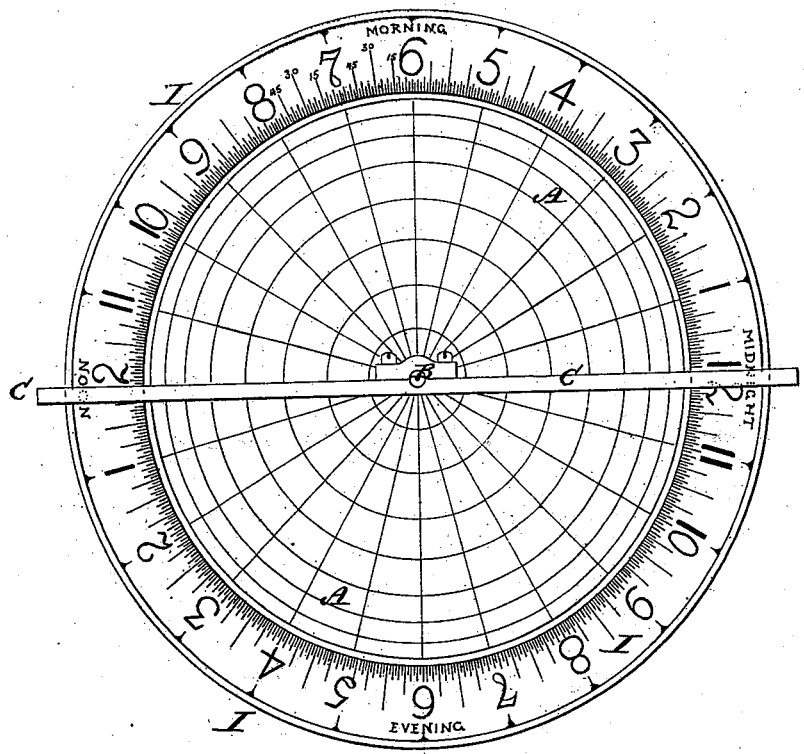
Figure 3:
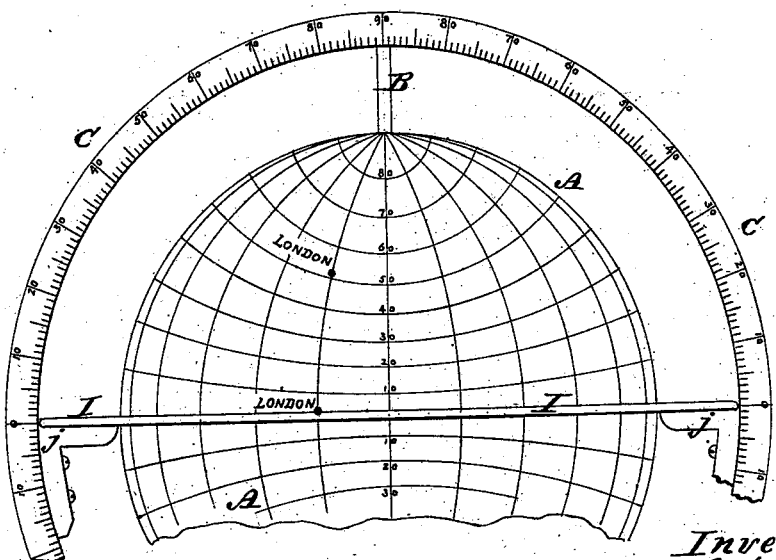

Figure 1 is a side view or elevation of our improved relative time-globe. Fig. 2 is an axial view of the globe alone, showing the equatorial dial, &c.; and Fig. 3 is a partial elevation, to illustrate more particularly the second part of our invention.

In the several figures the same part will be found designated by the same letter of reference.

A is an ordinary terrestrial globe, mounted to turn freely (by the application of hand-power) upon a shaft or axis, B, supported, as seen, in a meridian-ring, C, of the usual construction.

D is a clutch-stand, in which the meridian-ring is supported and held, and within which it may be turned to any required adjustment, and held or fastened by means of a clamping-screw, E, as shown. This clutch-stand has its lower cylindrical end set in a socket-piece, F, within which it turns freely on a vertical axis, and to which it may be rigidly fastened by the set-screw $g$, and said socket-piece F is mounted fast on any suitable pillar or supporting-column or stand H, having a sufficiently broad base to properly support the whole apparatus or machine.

I is the equatorial dial, which, as seen, is secured to projecting lugs $jj$ of the meridian-ring C, and is arranged adjacent to the equator of the globe, but so as to permit the free rotation within said dial-ring I of the globe A. This equatorial dial is subdivided on each of its faces into twenty-four hours, with the proper minute and second marks, which subdivisions are numbered, as shown, from one to twelve twice, to represent the twelve hours of day-time and twelve hours of night-time.

The operation will be seen to be as follows: The exact local time for any locality being known, set the globe by hand with the meridian of said locality corresponding at the equator with that point in the dial-ring I at which is marked said known time, and at the instant of so setting the globe its relation axially to the said dial-ring will indicate, by a visual observation of the relations of its meridian-lines at the equator to the time-divisions of said dial, the correct local time at any or every other place on the globe located on any or all such meridian-lines. Thus, if at the hour of twelve, noon, in New Orleans, Louisiana, the globe be set so that the meridian of that place coincides with the point of the dial-ring marked "twelve o'clock, noon," a glance at the relation borne to the dial by the meridian on which London, England, is located, will show the observer that according to the dial-ring it is six o'clock in the evening; and in like manner it can be observed with substantial correctness what differences of time exist between any place and any other place or places.

But to facilitate the use of the instrument or apparatus in the manner and for the purposes just explained, we propose to sometimes provide the globe with supplemental names of prominent places only, by preference printed or placed near the equatorial line or belt of the globe, so that the observer can see at a glance, and without tracing down or up the meridian of such place, the exact relation of the meridian of any such place to the time-divisions of the dial-ring. This feature of our invention is illustrated at Fig. 3, where it will be seen that, in addition to the placement of the small circle and name indicating the city of London, England, at its proper locality, (proper latitude,) we have also printed "London" on the globe, near the equator, but in the proper longitude, so that instead of having to seek the word "London" at the proper place on the globe, and then follow down the meridian-line to see where it coincides with the time-dial, the observer can see at a glance, and at the same point, both the dial-marks and the word "London." In like manner many other places may have the names duplicated in close proximity to the equator on the globe's surface without confusing the student of geography or complicating the globe's surface-printing, and at the same time afford the facilities explained in making observations of time differences.

Of course all the other and usual uses of the globe are understood, and, forming no part of our invention, need no explanation here.

Having so fully explained our invention that those skilled in the art can make and use our improved relative-time globe, what we claim as new, and desire to secure by Letters Patent, is—

1. The combination, with an ordinary terrestrial globe mounted to turn freely on a polar axis or shaft, of an equatorial dial-ring, arranged as described, and formed or provided with time-divisions corresponding to the diurnal movements of the earth, as set forth.

2. The employment, in connection with the globe and equatorial dial-ring, of supplemental or duplicate place-names, as and for the purposes specified.

In witness whereof we have hereunto set our hands and seals this 5th day of February, 1880.

JAMES ARKELL. [L. S.]
A. G. RICHMOND. [L. S.]

In presence of—
G. D. CONSAUL,
V. KIRBY.